US009901907B1

(12) United States Patent
Xiao et al.

(10) Patent No.: US 9,901,907 B1
(45) Date of Patent: Feb. 27, 2018

(54) CATALYTIC CONVERTERS WITH AGE-SUPPRESSING CATALYSTS

(71) Applicant: GM GLOBAL TECHNOLOGY OPERATIONS LLC, Detroit, MI (US)

(72) Inventors: Xingcheng Xiao, Troy, MI (US); Gongshin Qi, Troy, MI (US); Ryan J. Day, Waterford, MI (US); Ming Yang, Troy, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 15/253,039

(22) Filed: Aug. 31, 2016

(51) Int. Cl.
*B01J 21/04* (2006.01)
*B01J 21/06* (2006.01)
*B01J 21/08* (2006.01)
*B01J 21/10* (2006.01)
*B01J 21/12* (2006.01)
*B01J 21/14* (2006.01)
*B01J 23/40* (2006.01)
(Continued)

(52) U.S. Cl.
CPC ............ *B01J 23/44* (2013.01); *B01D 53/944* (2013.01); *B01D 53/945* (2013.01); *B01J 21/04* (2013.01); *B01J 35/0006* (2013.01); *B01J 35/0013* (2013.01); *B01J 37/0201* (2013.01); *B01J 37/0221* (2013.01); *B01J 37/088* (2013.01); *B01J 37/16* (2013.01); *F01N 3/101* (2013.01); *F01N 3/103* (2013.01); *F01N 3/2825* (2013.01); *B01D 2255/1023* (2013.01); *B01D 2255/9022* (2013.01); *F01N 2330/06* (2013.01); *F01N 2370/02* (2013.01)

(58) Field of Classification Search
CPC . B01J 21/04; B01J 21/06; B01J 21/063; B01J 21/066; B01J 21/08; B01J 21/10; B01J 21/12; B01J 21/14; B01J 23/40; B01J 23/42; B01J 23/44; B01J 23/46; B01J 23/58; B01J 23/60; B01J 23/63; B01J 35/0006; B01J 35/026; B01J 35/04
See application file for complete search history.

(56) References Cited

U.S. PATENT DOCUMENTS 6,022,825 A    2/2000   Anderson et al.
7,323,432 B2   1/2008   Niihara et al.
(Continued)

FOREIGN PATENT DOCUMENTS

CN    103974759    8/2014
EP      0695580     3/2003
(Continued)

OTHER PUBLICATIONS

Chen, et al; "Development of low temperature three-way catalysts for future fuel effecient vehicles"; Johnson Matthey Technol. Rev.; 2015; vol. 59; (1); pp. 64-67.
(Continued)

*Primary Examiner* — Cam N. Nguyen
(74) *Attorney, Agent, or Firm* — Harness, Dickey & Pierce, P.L.C.

(57) ABSTRACT

A catalytic converter includes a catalyst. The catalyst includes a support, platinum group metal (PGM) particles dispersed on the support, and metal oxide nanoparticles formed on the support. The metal oxide nanoparticles are dispersed between a first set of the PGM particles and a second set of the PGM particles to suppress aging of the PGM particles.

10 Claims, 5 Drawing Sheets

(51) Int. Cl.

| | |
|---|---|
| *B01J 23/42* | (2006.01) |
| *B01J 23/44* | (2006.01) |
| *B01J 23/46* | (2006.01) |
| *B01J 23/58* | (2006.01) |
| *B01J 23/60* | (2006.01) |
| *B01J 23/63* | (2006.01) |
| *B01J 35/00* | (2006.01) |
| *B01J 35/02* | (2006.01) |
| *B01J 35/04* | (2006.01) |
| *B01J 37/02* | (2006.01) |
| *B01J 37/16* | (2006.01) |
| *B01J 37/08* | (2006.01) |
| *F01N 3/10* | (2006.01) |
| *B01D 53/94* | (2006.01) |
| *F01N 3/28* | (2006.01) |

(56) References Cited

U.S. PATENT DOCUMENTS

| | | | |
|---|---|---|---|
| 7,659,224 B2 | 2/2010 | Shimazaki et al. | |
| 8,211,392 B2 | 7/2012 | Grubert et al. | |
| 8,349,761 B2 | 1/2013 | Xia et al. | |
| 8,679,433 B2 * | 3/2014 | Yin | B01D 53/944 423/213.2 |
| 8,969,237 B2 * | 3/2015 | Yin | B01D 53/944 427/446 |
| 8,992,869 B2 | 3/2015 | Ratts et al. | |
| 9,126,191 B2 * | 9/2015 | Yin | B01J 23/42 |
| 9,156,025 B2 * | 10/2015 | Qi | B01J 37/0228 |
| 9,427,732 B2 * | 8/2016 | Yin | B01J 35/0006 |
| 9,498,751 B2 * | 11/2016 | Yin | B01D 53/944 |
| 9,511,352 B2 * | 12/2016 | Qi | B01J 21/04 |
| 9,517,448 B2 * | 12/2016 | Kearl | B01D 53/9422 |
| 9,533,289 B2 * | 1/2017 | Yin | B01J 23/42 |
| 9,566,568 B2 * | 2/2017 | Yin | B01J 35/0006 |
| 9,649,627 B1 | 5/2017 | Xiao et al. | |
| 9,687,811 B2 * | 6/2017 | Biberger | F01N 3/0842 |
| 2002/0082163 A1 | 6/2002 | Yan et al. | |
| 2009/0041645 A1 | 2/2009 | Wassermann et al. | |
| 2010/0086832 A1 | 4/2010 | Lopez et al. | |
| 2010/0204518 A1 | 8/2010 | Wolf et al. | |
| 2011/0223096 A1 | 9/2011 | Wolf et al. | |
| 2013/0034472 A1 | 2/2013 | Cantrell et al. | |
| 2014/0057781 A1 | 2/2014 | Stamm Masias et al. | |
| 2014/0256534 A1 * | 9/2014 | Gao | B01D 53/944 502/5 |
| 2015/0231566 A1 | 8/2015 | Xu et al. | |
| 2015/0266014 A1 | 9/2015 | Xue et al. | |
| 2015/0368817 A1 * | 12/2015 | Xu | C25L 39/10 204/252 |

FOREIGN PATENT DOCUMENTS

| | | |
|---|---|---|
| GB | 2522978 | 8/2015 |
| JP | 2006192357 | 7/2006 |
| JP | 2009247968 | 10/2009 |
| JP | 2011230104 | 11/2011 |
| JP | 05747952 | 7/2015 |
| JP | 05806536 | 11/2015 |
| KR | 2011001004 | 1/2011 |
| KR | 1092606 | 12/2011 |
| WO | WO2007063615 | 6/2007 |
| WO | WO2013182302 | 12/2013 |

OTHER PUBLICATIONS

Chang, et al.; "Gasoline cold start concept (gCSC) technology for low temperature emission control"; SAE Int. J. Fuels Labr. 7(2); 2014 pp. 480-488.

Dai, et al.; "A sinter-resistant Catalytic system based on platinum nanoparticles supported on TiO2 nanofibers and covered by porous silica"; Angew. Chem.Int. Ed.; 2010; vol. 49 pp. 8165-8168.

Lu, et al.; "Coking- and sintering-resistant palladium catalysts achieved through atomic layer deposition" Science; 2012; vol. 335; No. 6073; pp. 1205-1208 Abstract Only.

Pan, et al. "Effect of alumina on structure and acidity of solid acid catalyst Pt-SO_4~(2-)/ZrO_2-Al_2O_3"; Chinese Journal of Catalysis; 2005; Abstract Only.

Wang; "Fabrication and testing of low-temperature catalytically active washcoat materials for next-generation vehicle catalytic converters"; YSU-CTME; 2013; pp. 1-9.

Li, et al.; "A sintering-resistant Pd/SiO2 catalyst by reverse-loading nano iron oxide for aerobic oxidation of benzyl alcohol"; RSC Advances; 2015; vol. 5; pp. 4766-4769; Abstract Only.

Lu, et al.; A sinter-resistant catalytic system fabricated by maneuvering the selectivity of SiO2 deposition onto the Tio2 surface versus the pt nanoparticle surface Nano Lett.; 2013; vol. 13 (10); pp. 4957-4962; Abstract Only.

U.S. Appl. No. 62/237,379, filed Oct. 5, 2015, Gongshin Qi et al.
U.S. Appl. No. 62/237,392, filed Oct. 5, 2015, Gongshin Qi et al.
U.S. Appl. No. 62/237,405, filed Oct. 5, 2015, Xingcheng Xiao et al.
U.S. Appl. No. 62/237,418, filed Oct. 5, 2015, Xingcheng Xiao et al.
U.S. Appl. No. 62/245,544, filed Oct. 23, 2015, Xingcheng Xiao et al.

* cited by examiner

CATALYTIC CONVERTERS WITH AGE-SUPPRESSING CATALYSTS

TECHNICAL FIELD

The present disclosure relates generally to catalytic converters, and more specifically to age-suppressing catalysts.

BACKGROUND

Vehicles with an Internal Combustion Engine (ICE) include an exhaust gas treatment system for treating the exhaust gas from the engine. The configuration of the treatment system depends, in part, upon whether the engine is a diesel engine (which typically operates with lean burn combustion and contains high concentrations of oxygen in the exhaust gases at all operating conditions) or a stoichiometric spark-ignited engine (which operates at a nearly stoichiometric air-to-fuel (A/F) ratio). The treatment system for the diesel engine includes a diesel oxidation catalyst (DOC), which is capable of oxidizing carbon monoxide (CO) and hydrocarbons (HC). The treatment system for the stoichiometric spark-ignited engine includes a three-way catalyst (TWC), which operates on the principle of non-selective catalytic reduction of $NO_x$ by CO and HC.

SUMMARY

A catalytic converter includes a catalyst. The catalyst includes a support, platinum group metal (PGM) particles dispersed on the support, and metal oxide nanoparticles formed on the support. The metal oxide nanoparticles are dispersed between a first set of the PGM particles and a second set of the PGM particles to suppress aging of the PGM particles.

BRIEF DESCRIPTION OF THE DRAWINGS

Features of examples of the present disclosure will become apparent by reference to the following detailed description and drawings, in which like reference numerals correspond to similar, though perhaps not identical, components. For the sake of brevity, reference numerals or features having a previously described function may or may not be described in connection with other drawings in which they appear.

DETAILED DESCRIPTION

Figure 1:
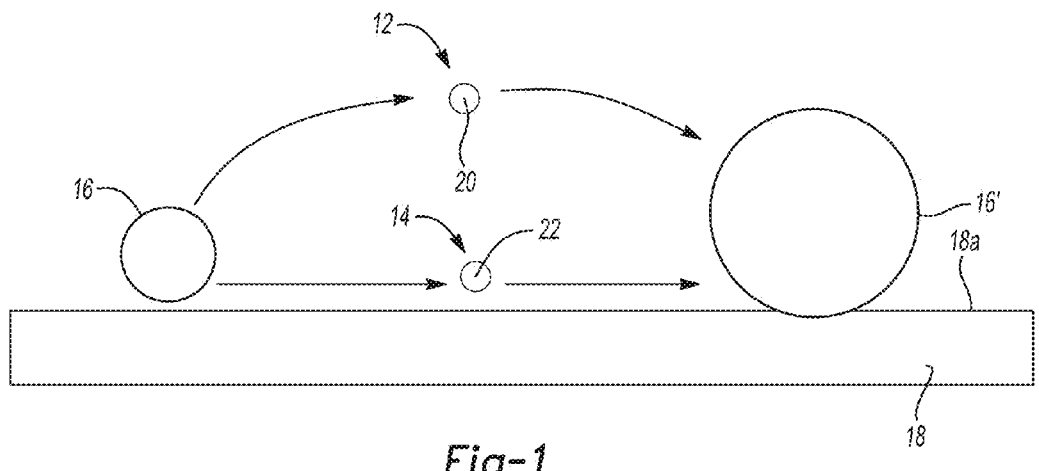
FIG. 1 is a schematic illustration depicting two mechanisms for PGM particle growth or sintering.

DOCs and TWCs often include a support loaded with a Platinum Group Metal (PGM) as the active catalytic/catalyst material. As the exhaust gas temperature from the vehicle engine increases (e.g., to temperatures ranging from 150° C. to about 1000° C.), the PGM loaded on the support may experience particle growth (i.e., sintering). FIG. 1 depicts two mechanisms for PGM particle growth during vehicle operation. The mechanisms involve atomic and/or crystallite PGM migration. The first mechanism involves PGM migration via a vapor phase, denoted 12, and the second mechanism involves PGM migration via surface diffusion, denoted 14. In the first mechanism, a mobile species (not shown), emitted from the PGM particles 16 loaded on the support 18, can travel through the vapor phase 12 and agglomerate with other metal particles 20 in the vapor phase 12 to form larger PGM particles 16'. In the second mechanism, a mobile species (not shown) emitted from the PGM particles 16 can diffuse along the surface 18a of the support 18 and agglomerate with other metal particles 22 on the surface 18a to form larger PGM particles 16'. The second mechanism may involve Ostwald ripening, where the migration of the mobile species is driven by differences in free energy and local atom concentrations on the support surface 18a.

An increase in the size of the PGM particles 16' results in poor PGM utilization and undesirable aging of the catalyst material. More specifically, the increased particle size reduces the PGM dispersion, which is a ratio of the number of surface PGM atoms in the catalyst to the total number of PGM atoms in the catalyst. A reduced PGM dispersion is directly related to a decrease in the active metal surface area (as a result of particle growth), and thus indicates a loss in active catalyst reaction sites, which equates to a decrease in catalyst activity. The loss in active catalyst reaction sites leads to poor PGM utilization efficiency, and indicates that the catalyst has undesirably been aged or deactivated.

It has been observed that about 1% of the PGM in a typical TWC remains catalytically active after 100,000 to 150,000 miles of driving (i.e., 99% of the PGM is wasted). One approach to counteract the effect of sintering is to use a high enough PGM loading to compensate for the catalyst deactivation. However, this increases the cost of the TWC.

The catalysts disclosed herein suppress aging by physically separating the PGM particles 16 with metal oxide nanoparticles formed on the support 18 around the PGM particles 16. By physically separating the PGM particles 16, the metal oxide nanoparticles aim to block surface diffusion.

Moreover, pores and cracks are present in and around the metal oxide nanoparticles. The pores and cracks expose surfaces of the metal oxide nanoparticles which can capture PGM vapors (e.g., by the condensation of PGM vapor on the exposed surfaces). The mobile species in the captured vapors agglomerate to form new PGM nanoparticles within pores and cracks. The newly formed PGM nanoparticles may be smaller than the PGM particles 16, and may provide additional active PGM sites for catalysis.

The configurations of the catalyst disclosed herein slow down or prevent the PGM particle growth/sintering and maintain more active PGM sites over time, and thus the catalyst ages slower than catalysts without the metal oxide nanoparticles. Moreover, when sintering is reduced or prevented, the operational temperature of the catalyst is prevented from drifting upward over time.

Figure 3:
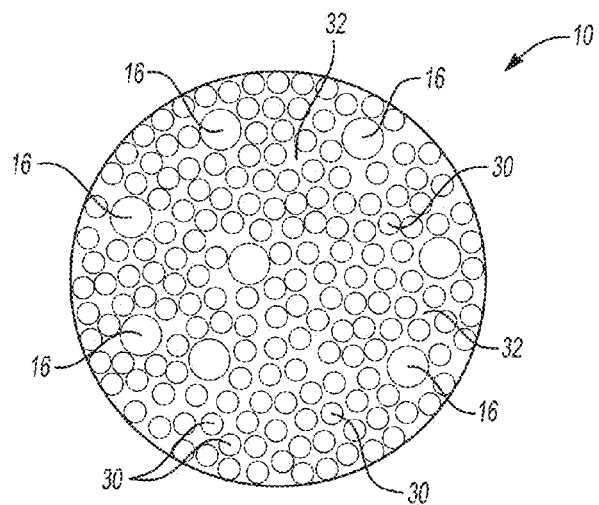
FIG. 3 is a semi-schematic, top view of an example of the catalyst disclosed herein.
Figure 2A:
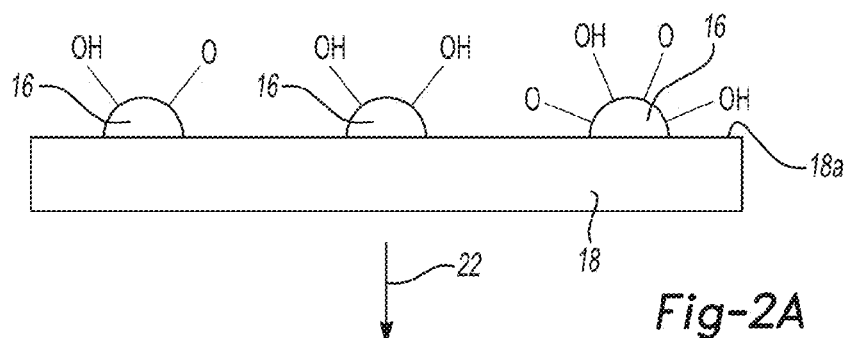
FIGS. 2A-2D schematically depict an example of a method for making an example of the catalyst disclosed herein.
Figure 2B:
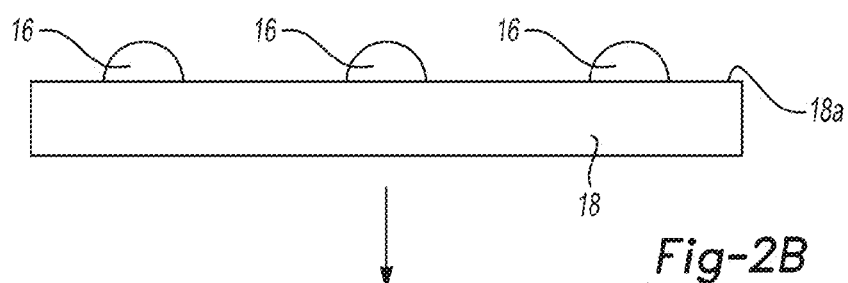
Figure 2C:
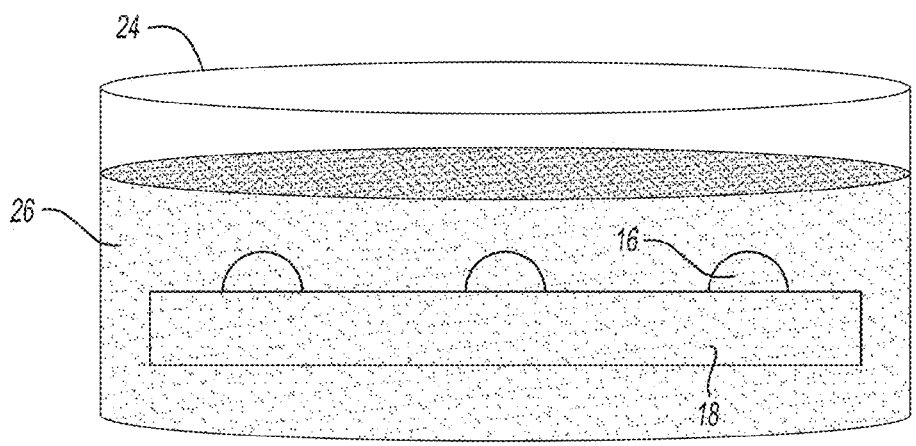
Figure 2D:
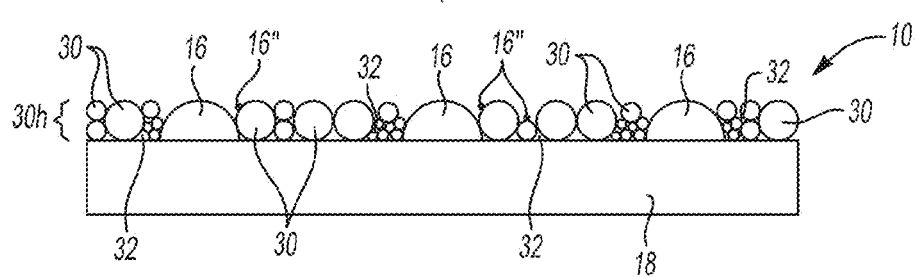

Referring now to FIGS. 2A through 2D, an example of a method for making an example of the catalyst 10 disclosed herein is depicted. One view of the catalyst 10 that is formed is shown in FIG. 2D, and another view of the catalyst 10 that is formed is shown in FIG. 3.

FIG. 2A depicts the support 18. The support 18 may be a porous metal oxide structure. The porous metal oxide structure may be formed of $Al_2O_3$, $CeO_2$, $ZrO_2$, $CeO_2$—$ZrO_2$, $SiO_2$, $TiO_2$, MgO, ZnO, BaO, $K_2O$, $Na_2O$, CaO, and combinations thereof. The porous metal oxide structure may be in the form of a powder, spheres, or any other suitable configuration. In an example, the support 18 has a diameter ranging from greater than or equal to 0.5 μm to less than or equal to about 10 μm.

The support 18 may also include several small pores (not shown). More pores increase the surface area to fit many PGM particles 16 in a small volume. In an example, the pore volume of the support 18 ranges from about 0.5 ml/g to about 2 ml/g. The surface area of the support 18 may range from about 50 $m^2/g$ about 150 $m^2/g$.

In one example of forming the method, the support 18 may be pre-sintered (i.e., before the PGM particles 16 and the metal oxide nanoparticles 30 are applied thereto). Pre-sintering may take place at a temperature ranging from about 900° C. to about 1000° C. Pre-sintering may reduce the surface area of the support 18 prior to formation of the PGM particles 16 and the metal oxide nanoparticles 30. Reducing the surface area of the support 18 means that there may be less of the surface 18*a* available for the metal oxide nanoparticles 30. Less metal oxide nanoparticle material reduces the weight increase of the final catalyst 10.

In FIG. 2A, the PGM particles 16 are applied to the support 18. The PGM particles 16 may be applied via an impregnation method. The impregnation method may be a dry (or incipient wetness) impregnation process or a wet impregnation process.

For both the dry and wet impregnation processes, a PGM precursor solution is utilized. The PGM precursor solution may be an aqueous solution containing water and a PGM precursor (i.e., a material that will decompose to a PGM metal, such as palladium (Pd), platinum (Pt), rhodium (Rh), ruthenium (Ru), osmium (Os), iridium (Ir), or various combinations thereof). Any number of PGM containing coordination complexes can be used as the PGM precursor. Some example PGM precursors include chloroplatinic acid (CPA), tetraammineplatinum chloride (or nitrate or hydroxide), platinum nitrate, platinum acetate, dinitrodiamine platinum, palladium nitrate, palladium acetate, bis-acetylacetonato palladium, rhodium nitrate, rhodium acetate, ruthenium (III) chloride, ruthenium (III) acetylacetonate, ruthenium (II) hexa-ammine dichloride, ruthenium (III) hexa-ammine trichloride, osmium (III) chloride hydrate, ammonium hexachloroosmate (IV), iridium (IV) chloride, ammonium hexachloroiridate, iridium (III) chloride, iridium sulfate, etc. PGM precursors of ruthenium, osmium, and/or iridium may also be used. Any of the PGM precursors may be added to water to form the PGM precursor. Combinations of PGM precursors may be used to form mixtures of different types of PGM particles 16 (e.g., a mixture of platinum and palladium particles).

The concentration of the precursor solution depends upon the desired loading of the PGM particles 16 on the support 18 and in the catalyst 10. For example, 10 g total of the catalyst 10 with 1.5% platinum equates to 0.15 g platinum (i.e., 1.5% of 10 g). The mass ratio of pure platinum to platinum precursor may be used to determine how much of the platinum precursor should be used to achieve the desired mass of platinum for the catalyst 10. For dry impregnation, the total amount of water added to make the aqueous solution depends upon the volume of water that will fill the pore volume, i.e., achieve incipient wetness. For wet impregnation, the total amount of water added to make the aqueous solution depends upon the solubility of the PGM precursor. In this example, this solution may be added to 9.85 g of dried support (i.e., 10 g total–0.15 g platinum=g support).

For dry impregnation, the PGM precursor solution is added to the support 18 until all of the pores of the support 18 are filled with the solution. No additional solution is added beyond the amount needed to fill the pores (i.e., incipient wetness). Capillary action draws the PGM precursor solution into the pores.

For wet impregnation, the support 18 is first filled with the same solvent (e.g., water) that is used for the PGM precursor solution. The wetted support 18 is then treated with the PGM precursor solution. In this example, high pressure is not developed in the pores of the support 18, but rather the PGM precursor migrates progressively from the PGM solution into the pores.

The impregnated support 18 is then exposed to drying to remove the water and calcining to convert the PGM precursor to the PGM particles 16. Drying may be performed in air at a temperature ranging from about room temperature (e.g., 18° C. to about 25° C.) to about 150° C. for a time period ranging from about 12 hours to about 24 hours, and calcining may be performed at a temperature ranging from about 300° C. to about 650° C. for a time period ranging from about 1 hour to about 4 hours. In an example, calcining is performed at about 550° C. for about 2 hours. This process decomposes the PGM precursor and forms the PGM particles 16 both within the pores of the support 18 and on at least some of the surface 18*a* of the support 18.

Each instance or occurrence of the PGM particles 16 on the surface 18*a* of the support is referred to herein as a set of PGM particles 16. In FIG. 2A, each individual PGM particle 16 is a set. However, it is to be understood that each set may be made up of several PGM particles 16 agglomerated together. For example, each PGM particle set may include a small cluster of the particles 16, with the particles 16 being similarly sized or having a distribution in particle size.

Each PGM particle 16 has at least one dimension (e.g., maximum diameter, height, width, etc.) up to 10 nm. In an example, each PGM particle 16 has a maximum diameter of greater than or equal to about 0.5 nm to less than or equal to about 10 nm. In another example, each PGM particle 16 has a maximum diameter of greater than or equal to about 2 nm to less than or equal to about 8 nm.

The PGM particles 16 are formed of active catalytic material, and may be palladium (Pd), platinum (Pt), rhodium (Rh), ruthenium (Ru), osmium (Os), iridium (Ir), or various combinations thereof (e.g., Pd and Pt, Pt and Rh, Pd and Rh, Pd, Pt and Rh, Pt and Ir, Pd and Os, or any other combination). The PGM particles 16 are present in the catalyst 10 in an amount ranging from about 0.1 wt % to about 10 wt % of the catalyst 10.

As shown in FIG. 2A, the applied PGM particles 16 may also have functional groups at their surfaces. These functional groups may include hydroxyl (OH) groups and/or oxygen (O) atoms.

In examples of the method disclosed herein, the PGM particles 16 are exposed to a process 22 that will render the particles 16 more hydrophobic than the surface 18*a* of the support 18. In an example, this process 22 reduces the OH and O functional group(s) on the surface of the PGM particles 16, and thus converts the PGM particles 16 into their metallic state, which is more hydrophobic than the support surface 18*a*. The PGM particles 16 after the reduction process 22, and thus in their metallic state, are shown in FIG. 2B.

As will be discussed below, the metal oxide nanoparticles 30 (shown in FIG. 2D) are formed using water-based wet chemical processes. Due to the hydrophobicity of the PGM particles 16, the metal oxide nanoparticles 30 preferentially form on the more hydrophilic support surface 18a. As such, the reduction process 22 prepares the PGM particles 16 for subsequent selective metal oxide nanoparticle formation.

The reduction process 22 does not deleteriously affect the exposed surface 18a of the support 18 (i.e., functional group(s) on the surface 18a remain reactive). The reduction process 22 may involve exposing the PGM particles 16 on (and in) the support 18 to a reducing environment at a temperature up to 400° C. for a time ranging from about 0.5 hours to about 10 hours. The reducing environment may be hydrogen gas ($H_2$), carbon monoxide (CO) gas, forming gas (i.e., a mixture of hydrogen and nitrogen), or may include a mixture of argon gas and hydrogen gas (e.g., Ar and 3% $H_2$) or a mixture of argon gas and CO gas. In one example, the hydroxyl (OH) functional groups on the surface of the PGM particles 16 are reduced to form water, which is evaporated as a result of the high temperature used during the reduction process 22.

The metal oxide nanoparticles 30 may then be formed on the exposed portions of the surface 18a of the support 18. The metal oxide nanoparticles 30 may be formed via any suitable wet chemical process, including an impregnation process, a sol-gel method, a hydrothermal process, and a precipitation process.

The wet chemical process is schematically shown in FIG. 2C. In an example, the support 18 having the PGM particles 16 therein/thereon is added to a suitable container 24. The support 18 having the PGM particles 16 therein/thereon is then contacted with an aqueous metal oxide nanoparticle precursor solution 26. The aqueous metal oxide nanoparticle precursor solution 26 and the support 18 having the PGM particles 16 therein/thereon are mixed together to form a mixture.

The aqueous metal oxide nanoparticle precursor solution 26 includes water and a metal oxide nanoparticle precursor dissolved in the water. Any number of metal salts can be used as the metal oxide nanoparticle precursor, and will depend upon the metal oxide that is to be formed. Some examples of suitable metal salts include salts of aluminum (Al), cerium (Ce), zirconium (Zr), titanium (Ti), silicon (Si), magnesium (Mg), zinc (Zn), barium (Ba), potassium (K), sodium (Na), calcium (Ca), or combinations thereof. As more specific examples, salts of Al include $AlCl_3$, $Al(NO_3)_3$, $Al(OH)_3$, $Al_2(SO_4)_3$, $Al(ClO_3)_3$, $AlO_4P$, and $Al(PO_3)_3$; salts of Ce include $Ce(NO_3)_3$, $Ce(OH)_4$, $Ce_2(SO_4)_3$, and $Ce(SO_4)_2$; salts of Zr include $Zr(HPO_4)_2$, $Zr(OH)_4$, and $Zr(SO_4)_2$; salts of Ti include $TiOSO_4$ and $TiOPO_4$; salts of Si include $SiPO_4(OH)$; salts of Mg include $MgSO_4$, $Mg(NO_3)_2$, $MgHPO_4$, and $Mg_3(PO_4)_2$; salts of Zn include $Zn(NO_3)_2$, $Zn_3(PO_4)_2$, and $ZnSO_4$; salts of Ba include $BaCO_3$, $BaCl_2$, and $BaCrO_4$; salts of K include $KHSO_4$, KCl, $K_2CO_3$, $K_2CrO_4$, $K_2Cr_2O_7$, KOH, $KIO_3$, KI, $K_2MnO_4$, $KVO_3$, $K_2MoO_4$, $KNO_3$, $KClO_4$, $K_2S_2O_8$, $K_2HPO_4$, $K_4P_2O_7$, and $K_2SO_4$; salts of Na include NaBr, NaCl, $Na_2CO_3$, $Na_2CrO_4$, HCOONa, $NaHSO_4$, NaOH, $NaBO_2$, $Na_2O_3Si$, $NaVO_3$, $Na_2MoO_4$, $NaNO_3$, NaOOCCOONa, $NaMnO_4$, $Na_3PO_4$, $Na_2HPO_4$, $Na_2H_2P_2O_7$, $Na_4P_2O_7$, $Na_2SO_4$, and $Na_3P_3O_9$; salts of Ca include $CaCl_2$, $CaCO_3$, $CaFPO_3$, $Ca(OH)_2$, $Ca(IO_3)_2$, $Ca(NO_3)_2$, $Ca(NO_2)_2$, $CaC_2O_4$, $Ca(H_2PO_4)_2$, $Ca_2P_2O_7$, and $CaSO_4$; and any combinations of these salts.

The concentration of the metal oxide nanoparticle precursor in the aqueous metal oxide nanoparticle precursor solution 26 depends upon the desired loading of the metal oxide nanoparticles 30 on the support 18 and in the catalyst 10. For example, 10 g total of the catalyst 10 with 5 wt % metal oxide nanoparticles equates to 0.5 g metal oxide (i.e., 5% of 10 g). The mass ratio of pure metal oxide to metal oxide precursor may be used to determine how much of the metal oxide precursor should be used to achieve the desired mass of metal oxide for the catalyst 10. The total amount of water added to the precursor solution 26 may depend upon the type of method used (e.g., dry impregnation) and/or the solubility of the metal oxide nanoparticle precursor. As one example, the concentration of the metal oxide nanoparticle precursor is selected so that the loading of the metal oxide nanoparticles 30 in the catalyst 10 ranges from about 5 wt % to about 20 wt % of the catalyst 10.

When the mixture of the aqueous metal oxide nanoparticle precursor solution 26 and the support 18 having the PGM particles 16 therein/thereon is formed, the metal oxide nanoparticle precursor migrates to the more hydrophilic support 18a and away from the more hydrophobic PGM particles 16.

The mixture is then exposed to drying and calcining (collectively shown at reference numeral 28 between FIGS. 2C and 2D). Drying is accomplished to remove the water and to leave the solid metal oxide nanoparticle precursor on the support 18a around the PGM particles 16. Calcining is accomplished to decompose the solid metal oxide nanoparticle precursor, and thus to convert the metal oxide nanoparticle precursor to the metal oxide nanoparticles 30. Drying may be passive, where the water is allowed to evaporate from the mixture. Drying may also be active, where the water is remove by exposure to an elevated drying temperature ranging from about room temperature (e.g., 18° C. to about 25° C.) to about 150° C. for a drying time period ranging from about 2 minutes to about 24 hours. Drying may be performed in air or vacuum. Calcining may be performed at a calcining temperature ranging from about 300° C. to about 600° C. for a calcining time period ranging from about 20 minutes to about 5 hours. In various aspects, the temperature applied during calcining does not exceed the melting point of the metal oxide derived from the metal oxide nanoparticle precursor (e.g., metal salt). As one example, drying may be performed in air for a time period ranging from about 2 hours to about 24 hours, and calcining may be performed at a temperature of about 550° C. for a time period of about 2 hours. While temperature and time ranges have been provided, it is to be understood that other temperatures and durations may be used to remove the water and to form the metal oxide nanoparticles 30. In various aspects, the temperature applied during calcining does not exceed the melting point of the metal oxide derived from the metal salt.

Since the PGM particles 16 have been treated to render them more hydrophobic during the formation of the metal oxide nanoparticles 30, the metal oxide nanoparticles 30 do not form on the PGM particles 16, but rather form on the exposed surface 18a of the support 18 (e.g., on those areas where the PGM particles 16 are not present). As illustrated in FIGS. 2D and 3, the metal oxide nanoparticles 30 form around the PGM particles 16, and thus physically separate each PGM particle set 16 from each other PGM particle set 16. The metal oxide nanoparticles 30 essentially form a porous wall or porous coating between the PGM particles 16 on the surface 18a of the support 18, which functions to prevent the PGM particles 16 from agglomerating through surface diffusion 22. The metal oxide nanoparticles 30 do not extend onto any of the PGM particles 16, and thus the PGM particles 16 can be exposed directly to the exhaust gas during vehicle operation.

The porous wall or coating of the metal oxide nanoparticles 30 includes the metal oxide nanoparticles 30 (which are crystalline and may be porous) and pores 32 formed between the metal oxide nanoparticles 30. The porous wall or coating has a porosity, i.e., a volume of pores 32 relative to the volume of coating, ranging from about 20% to about 70%. The average size of the pores 32 between the nanoparticles 30 ranges from about 0.5 nm to about 30 nm.

The pores 32 formed between the metal oxide nanoparticles 30 and any pores formed in the metal oxide nanoparticles 30 provide gaps through which the exhaust gas can reach the PGM particles 16. All of the pores increase the surface area of the catalyst 10 by exposing more surfaces of metal oxide nanoparticles 30. The exposed surfaces can suppress vapor phase migration 12 by the condensation of PGM vapor thereon. Any mobile species from the PGM particles 16 that migrates via the vapor phase 12 may become deposited (as particles 16" in FIG. 2D) on the surfaces of the metal oxide nanoparticles 30. These PGM particles 16" remain catalytically active.

The composition of the metal oxide nanoparticles 30 will depend upon the metal oxide nanoparticle precursor from which the metal oxide nanoparticles 30 are derived. As examples, the metal oxide nanoparticles 30 may be $Al_2O_3$, $CeO_2$, $ZrO_2$, $CeO_2$—$ZrO_2$, $SiO_2$, $TiO_2$, $MgO$, $ZnO$, $BaO$, $K_2O$, $Na_2O$, $CaO$, or combinations thereof.

The metal oxide nanoparticles 30 have a maximum diameter ranging from about 0.5 nm to about 50 nm. As other examples, the maximum diameter of the metal oxide nanoparticles may range from about 1 nm to about 25 nm, or from about 5 nm to 40 nm.

To prevent PGM particle 16 migration, the metal oxide nanoparticles 30 have a height 30$h$ that ranges from about 0.05X to about 10X, where X is a dimension of at least one of the PGM particle sets 16. The dimension of at least one of the PGM particles sets 16 is a diameter or width or height of a single particle 16 or of an agglomeration/cluster of particles 16. The height 30$h$ may be selected so that the metal oxide nanoparticles 30 are tall enough to prevent or suppress migration, and short enough so that the metal oxide nanoparticles 30 do not begin to cover the neighboring PGM particle(s) 16 and do not impede access of the exhaust gas to the PGM particles 16. In an example, if the particle size ranges from about 3 nm to about 5 nm, the height 30$h$ of the nanoparticles 30 may range from about 0.15 nm (0.05×3) to about 50 nm (10×5). The height 30$h$ could be achieved by a single metal oxide nanoparticle 30 or by several nanoparticles 30 that are stacked upon one another, or combinations thereof. The height of the metal oxide nanoparticles 30 can be controlled by the concentration of the metal oxide nanoparticle precursor (e.g., metal salt), which in some examples ranges from about 5 wt % to about 20 wt %. A higher concentration generally leads to larger nanoparticles 30.

The method may be used to suppress aging of PGM particles in a catalytic converter, and to maintain an operational temperature of a catalytic converter.

The methods disclosed herein may also be used to maintain the operational temperature of the catalyst 10 over time, and of a catalytic converter in which the catalyst 10 is used.

Figure 4A:
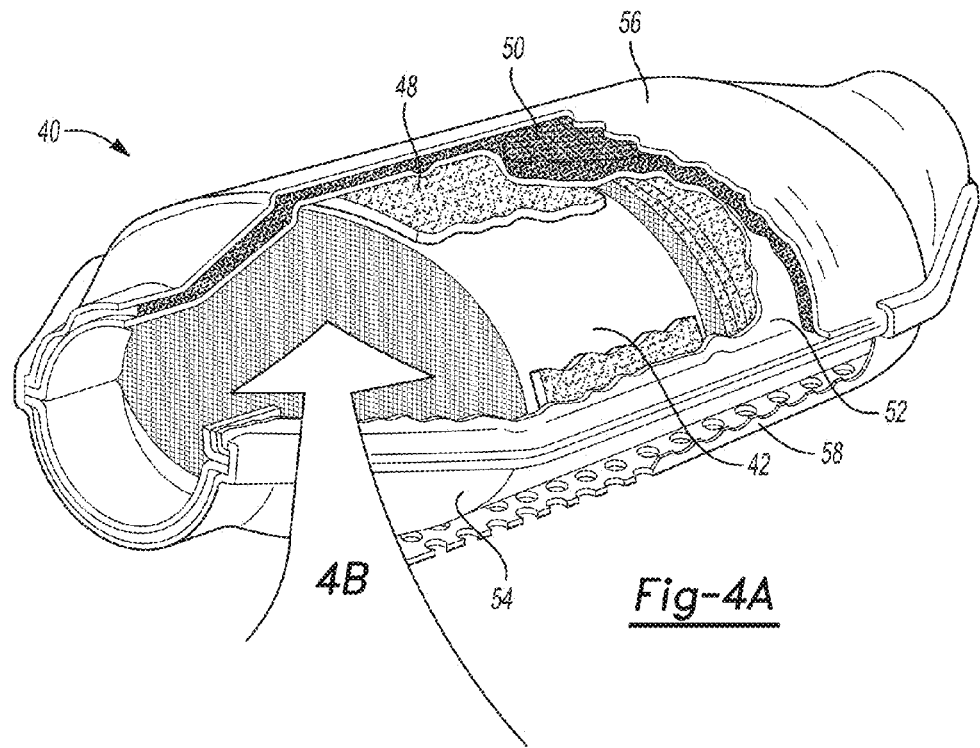
FIG. 4A is a perspective, partially cut-away view of an example of a catalytic converter.

The catalyst 10 may be formed via the method(s) disclosed herein, and then may be applied to a monolith substrate and utilized in a catalytic converter. An example of the catalytic converter 40 is shown in FIG. 4A, and an example of the monolith substrate 42 is shown in both FIGS. 4A and 4B.

The catalytic converter 40 includes the monolith substrate 42. The monolith substrate 42 may be formed of a ceramic or a metal alloy that is capable of withstanding high temperatures (e.g., 100° C. or higher). Synthetic cordierite is a magnesium-alumino-silicate ceramic material that is suitable for use as the monolith substrate 42. A ferritic iron-chromium-aluminum alloy is an example of a metal alloy that is suitable for use as the monolith substrate 42. The monolith substrate 42 has a honeycomb or other three-dimensional structure.

Figure 4B:
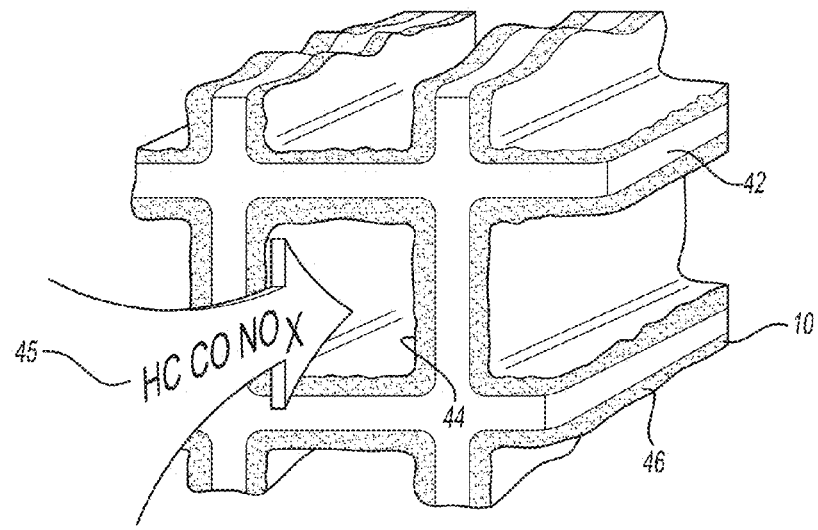
FIG. 4B is an enlarged view of a portion of FIG. 4A.

An enlarged view of a portion of the monolith substrate 42 is depicted in FIG. 4B. The monolith substrate 42 includes a large number of parallel flow channels 44 to allow for sufficient contact area between the exhaust gas 45 and the catalyst 10 (contained in coating 46) without creating excess pressure losses.

The coating 46 includes the catalyst 10 disclosed herein. In some instances, the coating 46 may also include a binder material (e.g., sol binders or the like). The coating 46 may be applied to the monolith substrate 42 by washcoating or some other similar processes.

Referring back to FIG. 4A, in the catalytic converter 40, the monolith substrate 42 is surrounded by a mat 48, which in turn is surrounded by insulation 50. Upper and lower shells 52, 54 (formed of metal) may be positioned between the mat 48 and the insulation 50. An insulation cover 56 may be positioned over the upper shell 52 and the insulation 50 thereon, and a shield 58 may be positioned adjacent to the lower shell 54 and the insulation 50.

The catalytic converter 50 may be a DOC, which is used in a diesel engine. The DOC is a two way catalytic converter, which eliminates hydrocarbons and CO by oxidizing them, respectively, to water and $CO_2$. The DOC may also exhibit $NO_x$ storage capability during the vehicle cold-start period. In such diesel engines, the reduction of $NO_x$ to water and $N_2$ may take place in a separate unit, and may involve the injection of urea into the exhaust.

The catalytic converter 40 may also be a TWC, which is used in a stoichiometric spark-ignited engine. The TWC is a three way catalytic converter, which reduces NOx to $N_2$, and oxidizes HC and CO, respectively, to water and $CO_2$. In an example, the carbon monoxide (CO) light-off temperature (measured at $T_{50}$, or the temperature at which 50% conversion of CO is achieved) of the TWC formed with Pd as the PGM is 208° C. or less and the hydrocarbon light-off temperature (measured at $T_{50}$, or the temperature at which 50% conversion of $C_3H_6$ is achieved) of the TWC formed with Pd as the PGM is 228° C. or less.

To further illustrate the present disclosure, an example is given herein. It is to be understood that this example is provided for illustrative purposes and is not to be construed as limiting the scope of the present disclosure.

Example

All of the samples included an alumina support with palladium particles loaded thereon via a dry impregnation process. During this process, an aqueous solution of a palladium nitrite was added to alumina power until all of the pores of the alumina powder were filled. Excess solution was not added. The impregnated powders were dried in air overnight, and then calcined in air at 550° C. for 2 hours to decompose the palladium precursor and form the palladium particles.

Comparative example 1 (C1) was a baseline sample, and included the alumina support with the palladium particles (1.3 wt %) loaded thereon. C1 was not exposed to any wet chemical processes.

Comparative example 2 (C2) included the alumina support with the palladium particles (1.2 wt %) loaded thereon. This comparative example was exposed to a wet chemical process. In particular, the alumina support with the palladium particles loaded thereon was exposed to an $Al(NO_3)_3$ solution to form a mixture. The mixture was dried at 150° C. for 10 minutes to remove water, and was then calcined at 500° C. for 2 hours to generate a porous alumina coating (composed of nanoparticles and pores) over the palladium particles and over the exposed surfaces of the alumina support.

The example (E) included the alumina support with the palladium particles (1.0 wt %) loaded thereon. For the example (E), the alumina support with the palladium particles was exposed to OH reduction and a wet chemical process. The reduction and wet chemical process conditions were as follows: the alumina support with the palladium particles loaded thereon was reduced for 2 hours in a mixture of Argon gas and 3% $H_2$ at 400° C.; the reduced sample was then exposed to an $AlCl_3$ solution to form a mixture; the mixture was dried at 150° C. for 10 minutes to remove water, and was then calcined at 500° C. for 2 hours to generate a porous alumina coating (composed of nanoparticles and pores) over the exposed surfaces of the alumina support. The porous alumina coating was not formed over the palladium particles.

The comparative examples C1, C2 and the example E were exposed to an aging process. The aging process involved exposing the samples to 950° C. for 2 hours in air with 10% water added.

Figure 5A:
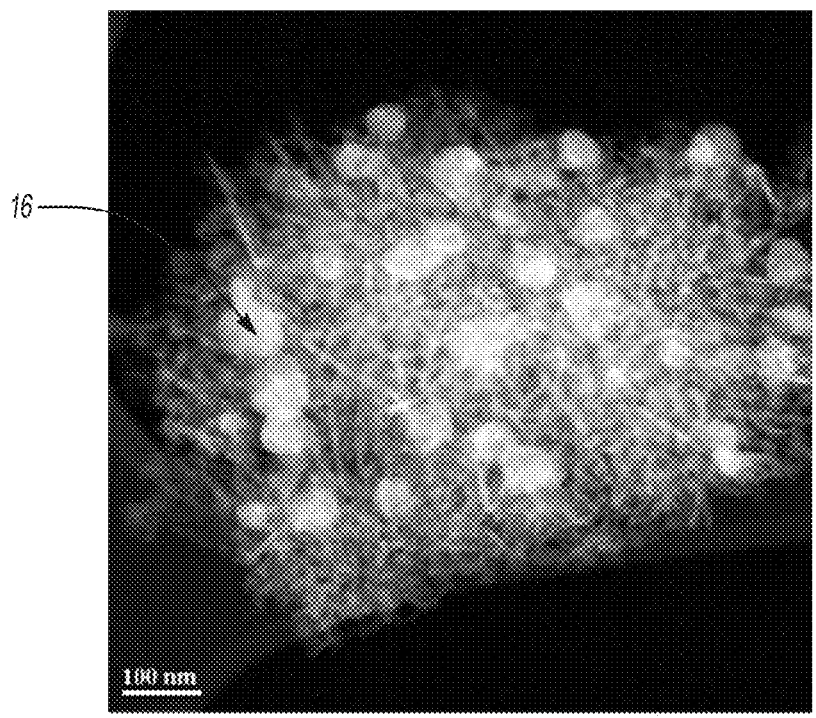
FIGS. 5A and 5B are transmission electron microscopy (TEM) images of a comparative example catalyst (C1) and an example catalyst (E)
Figure 5B:
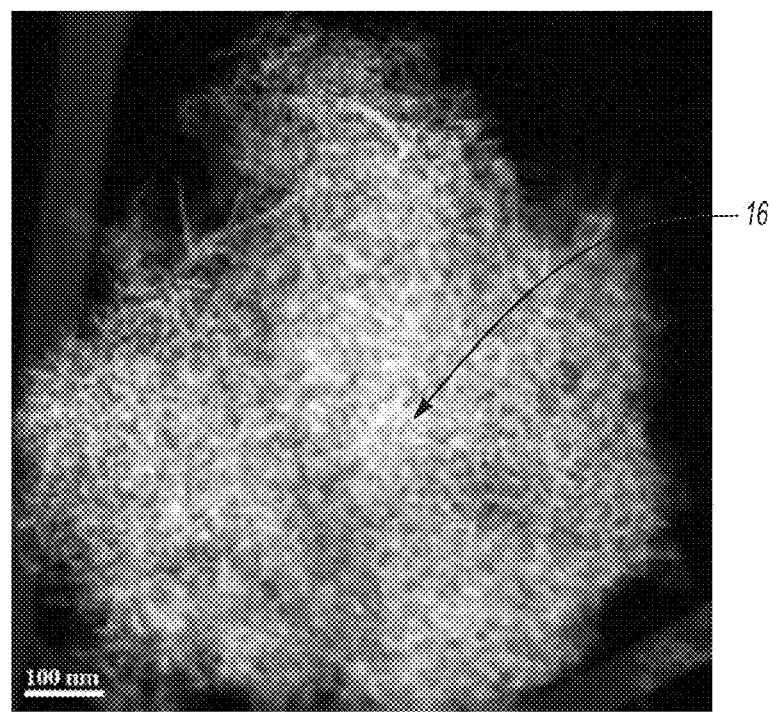

TEM images were taken of comparative example C1 and example E after aging. The images of C1 and E are shown in FIGS. 5A and 5B, respectively. When comparing the two images, the palladium particles have significantly grown in size in the comparative example C1. These images illustrate that the sintering effect of the PGM particles has been significantly suppressed in example E including the metal oxide nanoparticles 30 formed around, but not on, the PGM particles 16.

The aged comparative examples C1, C2 and the example E were exposed to exhaust gas (containing 5000 ppm CO, 500 ppm hydrocarbons (e.g., $C_3H_6$ and $C_3H_8$), 1% $O_2$, 5% $H_2O$, and $N_2$ balance) at an inlet temperature that was ramped up at a rate of 2° C. per minute. The space velocity (SV) was 1,500,000 $cm^3$ $g_{catalyst}^{-1}h^{-1}$, where space velocity refers to the quotient of the entering volumetric flow rate of the reactants divided by the reactor volume (or the catalyst bed volume) in a unit time.

The light-off temperatures of the comparative examples C1, C2 and the example E for CO and for $C_3H_6$ were determined. The light-off temperatures were measured at $T_{50}$, which is the temperature at which 50% conversion of CO or $C_3H_6$ is achieved. The lower $T_{50}$, the better.

Figure 6:
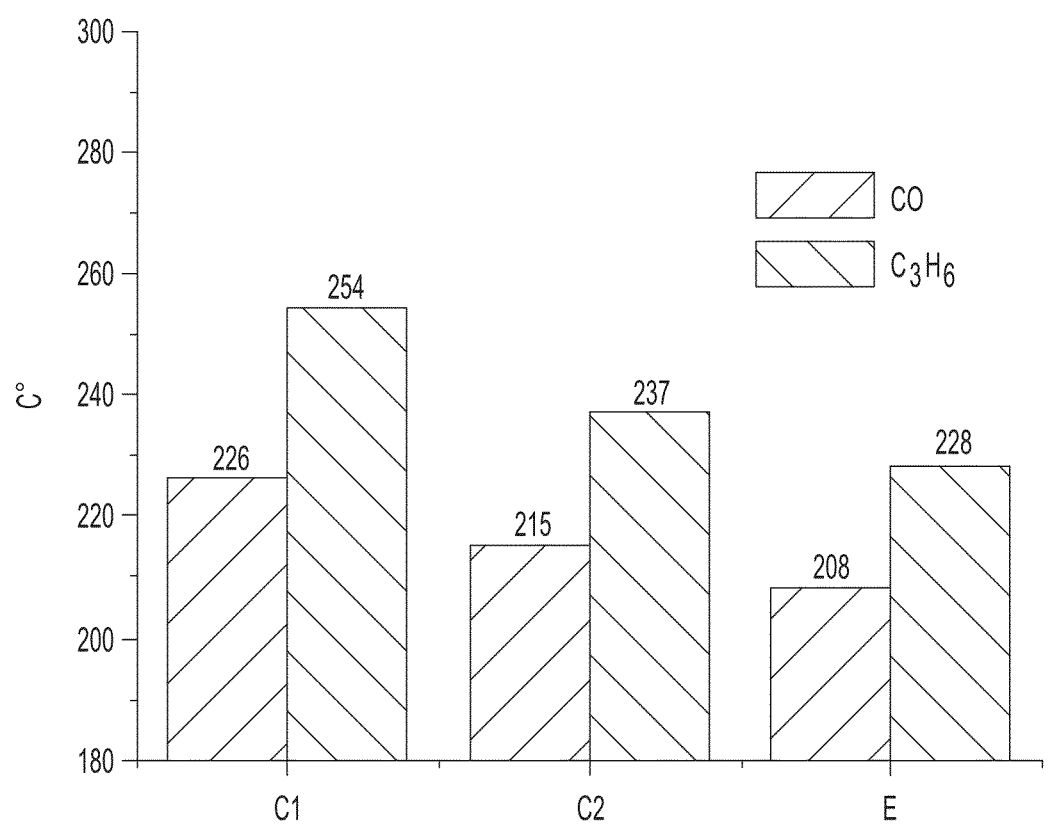
FIG. 6 is a graph depicting the light-off temperature (in ° C.) for carbon monoxide (CO) conversion and for $C_3H_6$ (propene or, alternatively, propylene) conversion for two comparative example catalysts (C1 and C2) and an example catalyst (E) including metal oxide nanoparticles formed between the PGM particles.

The results are shown in FIG. 6 and in Table I below. As illustrated, the catalyst disclosed herein (example E, including the metal oxide nanoparticles 30 formed around, but not on, the PGM particles 16) exhibits lower CO and HC light-off temperatures than comparative example C1 without any metal oxide nanoparticles, and comparative example C2 with metal oxide nanoparticles forming a porous coating over the PGM particles and the support.

TABLE I

| CO and $C_3H_6$ Light-Off Temperature ($T_{50}$) | | | | |
| --- | --- | --- | --- | --- |
| C1 | C2 | E | ΔT (C1-E) | ΔT (C2-E) |
| CO 226° C. | 215° C. | 208° C. | 18° C. | 7° C. |
| $C_3H_6$ 254° C. | 237° C. | 228° C. | 26° C. | 9° C. |

The drop in the light-off temperatures (ΔT ranging from about 7° C. to about 26° C.) of the example, E, including the metal oxide nanoparticles 30 formed around, but not on, the PGM particles 16 is advantageous, in part, because the catalyst disclosed herein is capable of CO and HC oxidation activity at lower temperatures. As illustrated in this Example, these results are also expected to translate into significantly lower PGM loadings required for the same performance, which may lead to a reduction in cost of the precious metals used in the catalyst. For example, up to an 80% reduction of the PGM loading may be achieved because a 10° decrease in light-off temperature may result in up to a 50% PGM loading reduction.

The method disclosed herein provides a solution-based approach for minimizing or eliminating sintering. This approach generates porous metal oxide nanoparticles 30 that surround PGM particles 16, which decrease catalyst activity loss by suppresses aging caused by sintering. The current solution-based approach, relative to other chemistry-based approaches, is a low cost wet-chemistry process, which results in a higher thermal durability and reduces catalyst metal loading requirements. For example, relative to a conventional catalyst system having the same catalyst and support material, but lacking the porous metal oxide nanoparticles, the present technology may reduce metal loading requirements by greater than or equal to 50%.

It is to be understood that the ranges provided herein include the stated range and any value or sub-range within the stated range. For example, a range of from about 900° C. to about 1000° C. should be interpreted to include not only the explicitly recited limits of from about 900° C. to about 1000° C., but also to include individual values, such as 925° C., 950° C., 980° C., etc., and sub-ranges, such as from about 915° C. to about 975° C., from about 920° C. to about 980° C., etc. Furthermore, when "about" is utilized to describe a value, this is meant to encompass minor variations (up to +/−10%) from the stated value.

Reference throughout the specification to "one example", "another example", "an example", and so forth, means that a particular element (e.g., feature, structure, and/or characteristic) described in connection with the example is included in at least one example described herein, and may or may not be present in other examples. In addition, it is to be understood that the described elements for any example may be combined in any suitable manner in the various examples unless the context clearly dictates otherwise.

In describing and claiming the examples disclosed herein, the singular forms "a", "an", and "the" include plural referents unless the context clearly dictates otherwise.

While several examples have been described in detail, it is to be understood that the disclosed examples may be modified. Therefore, the foregoing description is to be considered exemplary rather than limiting.

The invention claimed is:

1. A catalytic converter, comprising:
a catalyst including:
   a support;
   platinum group metal (PGM) particles dispersed on the support; and
   metal oxide nanoparticles formed on the support, the metal oxide nanoparticles dispersed between a first set of the PGM particles and a second set of the PGM particles to suppress aging of the PGM particles.

2. The catalytic converter as defined in claim 1, wherein the support and the metal oxide nanoparticles are independently selected from the group consisting of $Al_2O_3$, $CeO_2$, $ZrO_2$, $CeO_2$—$ZrO_2$, $SiO_2$, $TiO_2$, MgO, ZnO, BaO, $K_2O$, $Na_2O$, CaO, and combinations thereof.

3. The catalytic converter as defined in claim 2 wherein the support is pre-sintered.

4. The catalytic converter as defined in claim 1 wherein each of the first set of the PGM particles and the second set of the PGM particles has at least one dimension up to 10 nm.

5. The catalytic converter as defined in claim 1 wherein the metal oxide nanoparticles are stacked to a height ranging from about 0.05X to about 10X, where X is a dimension of at least one of the first and second sets of the PGM particles.

6. The catalytic converter as defined in claim 1 wherein the metal oxide nanoparticles make up from about 5 wt % to about 20 wt % of the catalyst.

7. The catalytic converter as defined in claim 1 wherein the metal oxide nanoparticles do not extend onto any of the PGM particles.

8. The catalytic converter as defined in claim 1 wherein the metal oxide nanoparticles are formed around each of the first and second sets of the PGM particles.

9. The catalytic converter as defined in claim 1, further comprising a monolith substrate having a honeycomb structure, wherein the catalyst is applied on interior surfaces of the honeycomb structure.

10. The catalytic converter as defined in claim 1 wherein the PGM particles are selected from the group consisting of palladium, platinum, rhodium, ruthenium, osmium, iridium, and combinations thereof.

* * * * *